United States Patent [19]
Nitta et al.

[11] 4,035,819
[45] July 12, 1977

[54] METHOD OF MAKING A ZINC SULPHIDE CERAMIC BODY AND A ZINC SULPHIDE CERAMIC BODY MADE THEREBY

[75] Inventors: Tsuneharu Nitta, Katano; Shigeru Hayakawa; Yukio Kasahara, both of Hirakata; Ziro Terada, Osaka, all of Japan

[73] Assignee: Matsushita Electric Industrial Co., Ltd., Japan

[21] Appl. No.: 515,103

[22] Filed: Oct. 15, 1974

[30] Foreign Application Priority Data
Oct. 19, 1973 Japan ............................ 48-118166
Nov. 13, 1973 Japan ............................ 48-127999

[51] Int. Cl.² .................................... H01L 29/12
[52] U.S. Cl. .................................... 357/10; 357/16;
106/70; 252/62.3 ZB; 252/62.3 ZT;
252/301.6 S; 264/61; 264/62; 264/82; 427/74;
427/79; 427/87; 427/100; 427/101; 427/126;
428/539; 428/469
[58] Field of Search ............. 427/399, 74, 79, 100,
427/215, 101, 314, 401, 294, 87, 126; 106/70;
252/301.6 S, 62.3 ZB, 62.3 ZT; 264/60, 61,
82, 62; 29/576; 357/10, 16; 428/539, 469

[56] References Cited
U.S. PATENT DOCUMENTS

| | | | |
|---|---|---|---|
| 2,310,424 | 2/1943 | Goodman | 252/301.6 S |
| 2,310,425 | 2/1943 | Goodman | 252/301.6 S |
| 2,573,817 | 11/1951 | Thomsen | 252/301.6 S |
| 2,802,792 | 8/1957 | Butler | 252/301.6 S |
| 2,908,588 | 10/1959 | Harper | 427/64 |
| 3,691,088 | 9/1972 | Pelton | 252/301.6 |
| 3,704,232 | 11/1972 | Frey | 252/301.6 S |
| 3,791,844 | 2/1974 | Tecotzky | 427/215 |

*Primary Examiner*—Michael F. Esposito
*Attorney, Agent, or Firm*—Wenderoth, Lind & Ponack

[57] ABSTRACT

A method of making a zinc sulphide ceramic body having a low electrical resistance characterized by sulphurizing a starting oxide material consisting essentially of zinc oxide and from 0.01 atomic % to 6.0 atomic % of at least one oxide of a metal selected from the group consisting of aluminum, magnesium, nickel, cobalt, cadmium, lead, indium, bismuth, antimony, titanium, zirconium, silicon, tin, niobium, tantalum, tungsten, and the rare earth element metals in a carbon disulphide atmosphere at a temperature in the range of 700° C to 1000° C. This zinc sulphide ceramic body can be formed into non-linear elements such as phosphors, photoconductors, luminescent elements, varistors, piezoelectric transducers, capacitors and combinations thereof. Particularly, by using this zinc sulphide body in light emitting elements, the luminous efficiency as well as the working voltage can be improved.

2 Claims, 6 Drawing Figures

METHOD OF MAKING A ZINC SULPHIDE CERAMIC BODY AND A ZINC SULPHIDE CERAMIC BODY MADE THEREBY

This invention relates to a method of making a zinc sulphide ceramic body and zinc sulphide ceramic bodies made thereby which can advantageously be formed into electrical elements such as photoconductors, luminescent elements, phosphors, capacitors, varistors, piezoelectric transducers and combinations thereof.

Most zinc sulphide materials, which are well known in some fields of electrical devices, are single crystal materials. For a particular application e.g., for ZnS luminescent bodies, a sulphide material is used in a sheet form which is prepared by incorporating the sulphide powder into materials such as organic binders. However, the amount of natural good-quality single crystals produced is decreasing year by year, and synthetic single crystals are quite expensive. In addition, these single crystals are disadvantageous for use in electrical devices because of the necessity of cutting them along a certain crystal axis and of strictly controlling the preparation and concentration of quite inexpensively available, it is not heat resistant, and therefore it has a narrow working temperature range.

In contract to the above-mentioned materials, bodies are advantageous, because they can be readily configured into the desired shape and are suitable for mass production with relative ease. Furthermore, since such a ceramic body has a polycrystalline structure in which the grains are connected at grain boundaries, the grain boundaries as well as the grains can be controlled by doping with impurities, etc. Therefore, poly-crystalline ceramic bodies are advantageous in these respects over single crystals.

It has been well known that zinc sulphide has a relatively high electrical resistance ($\geq 10^6$ $\Omega$cm) at room temperature (20° C to 30° C) and is an N-type semiconductor the current carriers of which are electrons. When the zinc sulphide contacts a further semiconductor, a potential barrier layer is formed at the interface between the zinc sulphide and the further semiconductor. The potential barrier layer is related to various kinds of properties such as electroluminescence, photoconductivity, capacitive action, piezoelectricity, etc. which zinc sulphide bodies can exhibit. However, it has been difficult to obtain the elements for use in operating with a low loss as well as a low voltage which the modern electronics industry requires. This is attributable to the zinc sulphide bodies having high electrical resistance.

Accordingly, a principal object of this invention is to provide sulphide ceramic bodies comprising semiconductive zinc sulphide characterized by low electrical resistance.

Another object of this invention is to provide a method of making sulphide ceramic bodies comprising semiconductive zinc sulphide characterized by low electrical resistance.

More details of this invention will become apparent upon consideration of the following description taken together with the accompanying drawings in which.

Figure 1:
FIG. 1 is a schematic cross-sectional view of a zinc sulphide ceramic body in accordance with this invention.

In accordance with this invention, it has been discovered that a zinc sulphide ceramic body characterized by a low electrical resistance can be obtained by sulphurizing at least one portion of a body of zinc oxide material consisting essentially of zinc oxide and from 0.01 atomic % to 6.0 atomic % of at least one oxide of a metal selected from the group consisting of, aluminum, magnesium, nickel, cobalt, cadmium, lead, indium, bismuth, antimony, titanium, zirconium, silicon, tin, niobium, tantalum, tungsten, and the rare earth metals in a consisting of yttrium, scandium and lanthanide in a carbon disulphide atmosphere at a temperature in the range of 700° C–1000° C so as to make the at least one portion a sulphide thereof. The sulphurization (reaction sintering) is considered to be attributable to the very strong reducing action of carbon disulphide. Furthermore, the sulphurization occurs below the temperatures at which the formed sulphide decomposes or sublimes. However, since the partial pressure of sulphur caused by dissociation of carbon disulphide increases considerably above 1000° C, the temperature of the sulphurization should preferably be kept at less than 1000° C. Starting zinc oxide materials easily react with carbon disulphide at a temperature less than 1000° C. The above-recited body of zinc oxide materials includes (1) a body prepared by pressure-compacting a starting oxide material consisting essentially of zinc oxide and from 0.01 atomic % to 6.0 atomic % of at least one metal oxide selected from the group consisting of aluminum, magnesium, nickel, cobalt, cadmium, lead, indium, bismuth, antimony, titanium, zirconium, silicon, tin, niobium, tantalum, tungsten, and rare earth element consisting of yttrium, scandium, and lanthanide. Under these conditions, the whole of the oxide material (compacted powder) is easily changed to a uniform sulphide material by the sulphurization step.

The above-recited body of oxide material also includes (2) a dense ceramic prepared by mixing a starting oxide material consisting essentially of zinc oxide and from 0.01 to 6.0 atomic % of at least one oxide of a metal selected from the group consisting of aluminum, magnesium, nickel, cobalt, cadmium, lead, indium, bismuth, antimony, titanium, zirconium silicon, tin, niobium, tantalum, tungsten, and the rare earth metals pressure-compacting the thus mixed material and sintering the thus pressure-compacted material. When the sulphurization is carried out for a long time, the whole of the dense ceramic is sulphurized. When the sulphurization is carried out for an appropriate time, the dense ceramic is partially sulphurized by the sulphurization, and the resultant ceramic body becomes a junction ceramic body composed of a ceramic of oxide material and a sulphide ceramic. Thus, a junction ceramic body can be easily made thereby.

The above-recited body of oxide material further includes (3) a body prepared by mixing a starting oxide material consisting essentially of zinc oxide and from 0.01 atomic % to 6.0 atomic % of at least one oxide of a metal selected from the group consisting of aluminum, magnesium, nickel, cobalt, cadmium, lead, indium, bismuth, antimony, titanium, zirconium, silicon, tin, niobium, tantalum, tungsten, and the rare earth metals pressure-compacted the thus mixed material, sintering the thus pressure-compacted material into a ceramic, crushing the thus made ceramic into ceramic particles, and further pressure-compacting the thus made ceramic particles. In this case, the surface layer of each of the ceramic particles is sulphurized by the sulphurization. Of course, when the sulphurization is carried out for a long time, not only the surface but also the bulk of each ceramic particle is sulphurized. Briefly speaking, according to this invention, a metal oxide is used as a starting oxide material, and the result is a metal sulphide.

The advantages of the method of this invention are as follows. Zinc sulphides of high quality characterized by low electrical resistance can be easily made. This method does not produce so called air pollution of sulphides such as $SO_2$. Thin films of zinc sulphide ceramic materials can be easily made, which is advantageous when it is taken into consideration that the modern electronics industry requires miniaturization and molding of circuits and also requires elements for operation at a low voltage. Since oxides are used as starting materials instead of sulphide powders, mass inexpensive production of zinc sulphide ceramics becomes possible. The temperature for sulphurization is relatively low. The thickness of the zinc sulphide layers can be easily controlled. A further important feature of this invention is as follows. It is well known that zinc oxide easily forms a solid solution with any component as compared with a zinc sulphide because the zinc oxide is more stable up to high temperature than the zinc sulphide. According to this invention, if an oxide solid solution containing zinc oxide as a main component can be prepared, the oxide solid solution can be easily converted into the corresponding sulphide solid solution due to the low temperature reaction between oxide and carbon disulphide.

The following are detailed descriptions of making zinc sulphide ceramics employing the concept of this invention. The concept of this invention is not limited by the details described below.

The component oxides are intimately mixed in the desired composition proportions and fired in accordance with a schedule set forth hereinafter for production of a fired ceramic body.

Table I

| Sample No. | Starting Oxide component in atomic % | | | | Electrical Resistance of the Formed Sulphide ceramic Body at 20° C ($\Omega$-cm) |
|---|---|---|---|---|---|
| 1* | ZnO | | | | $3.2 \times 10^6$ |
| 2* | ZnO | 99.995 | $Al_2O_3$ | 0.005 | $1.0 \times 10^6$ |
| 3 | ZnO | 99.99 | $Al_2O_3$ | 0.01 | $1.0 \times 10^3$ |
| 4 | ZnO | 99.5 | $Al_2O_3$ | 0.5 | $9.0 \times 10^2$ |
| 5 | ZnO | 98.0 | $Al_2O_3$ | 2.0 | $1.0 \times 10^3$ |
| 6 | ZnO | 94.0 | $Al_2O_3$ | 6.0 | $1.0 \times 10^3$ |
| 7 | ZnO | 92.0 | $Al_2O_3$ | 8.0 | $7.2 \times 10^5$ |
| 8 | ZnO | 99.5 | MgO | 0.5 | $2.4 \times 10^3$ |
| 9 | ZnO | 98.0 | MgO | 2.0 | $1.1 \times 10^3$ |
| 10 | ZnO | 99.5 | NiO | 0.5 | $3.6 \times 10^3$ |
| 11 | ZnO | 99.5 | CoO | 0.5 | $3.2 \times 10^3$ |
| 12 | ZnO | 99.5 | CdO | 0.5 | $2.1 \times 10^3$ |
| 13 | ZnO | 99.5 | PbO | 0.5 | $3.5 \times 10^3$ |
| 14 | ZnO | 99.99 | $In_2O_3$ | 0.01 | $2.6 \times 10^2$ |
| 15 | ZnO | 99.5 | $In_2O_3$ | 0.5 | $7.0 \times 10^2$ |
| 16 | ZnO | 98.0 | $In_2O_3$ | 2.0 | $5.0 \times 10$ |
| 17 | ZnO | 96.0 | $In_2O_3$ | 4.0 | $3.8 \times 10^3$ |
| 18 | ZnO | 94.0 | $In_2O_3$ | 6.0 | $5.2 \times 10^5$ |
| 19* | ZnO | 92.0 | $In_2O_3$ | 8.0 | $9.2 \times 10^6$ |
| 20 | ZnO | 99.99 | $Bi_2O_3$ | 0.01 | $2.8 \times 10^4$ |
| 21 | ZnO | 99.5 | $Bi_2O_3$ | 0.5 | $6.0 \times 10^2$ |
| 22 | ZnO | 98.0 | $Vi_2O_3$ | 2.0 | $1.6 \times 10^3$ |
| 23 | ZnO | 96.0 | $Bi_2O_3$ | 4.0 | $7.2 \times 10^4$ |
| 24 | ZnO | 94.0 | $Bi_2O_3$ | 6.0 | $5.7 \times 10^5$ |
| 25* | ZnO | 92.0 | $Bi_2O_3$ | 8.0 | $3.4 \times 10^7$ |
| 26 | ZnO | 99.99 | $Sb_2O_3$ | 0.01 | $3.8 \times 10^5$ |
| 27 | ZnO | 99.5 | $Sb_2O_3$ | 0.5 | $7.5 \times 10^2$ |
| 28 | ZnO | 98.0 | $Sb_2O_3$ | 2.0 | $8.0 \times 10^3$ |
| 29 | ZnO | 96.0 | $Sb_2O_3$ | 4.0 | $8.0 \times 10^3$ |
| 30 | ZnO | 94.0 | $Sb_2O_3$ | 6.0 | $1.2 \times 10^4$ |
| 31* | ZnO | 92.0 | $Sb_2O_3$ | 8.0 | $7.8 \times 10^6$ |
| 32 | ZnO | 99.5 | $TiO_2$ | 0.5 | $6.7 \times 10^3$ |
| 33 | ZnO | 99.5 | $ZrO_2$ | 0.5 | $5.4 \times 10^3$ |
| 34 | ZnO | 99.5 | $SiO_2$ | 0.5 | $9.2 \times 10^2$ |
| 35 | ZnO | 96.0 | $SiO_2$ | 4.0 | $4.8 \times 10^4$ |
| 36 | ZnO | 99.5 | $SnO_2$ | 0.5 | $8.7 \times 10^2$ |
| 37 | ZnO | 99.5 | $Nb_2O_5$ | 0.5 | $7.2 \times 10^3$ |
| 38 | ZnO | 99.5 | $Ta_2O_5$ | 0.5 | $0.4 \times 10^3$ |
| 39 | ZnO | 94.5 | $WO_3$ | 0.5 | $4.3 \times 10^3$ |
| 40 | ZnO | 99.5 | $Sc_2O_3$ | 0.5 | $5.2 \times 10^3$ |
| 41 | ZnO | 99.5 | $Y_2O_3$ | 0.5 | $5.2 \times 10^3$ |
| 42 | ZnO | 99.5 | $CeO_2$ | 0.5 | $4.8 \times 10^3$ |
| 43 | ZnO | 99.5 | $Eu_2O_3$ | 0.5 | $6.2 \times 10^3$ |
| 44 | ZnO | 99.5 | $Tb_2O_3$ | 0.5 | $4.8 \times 10^3$ |
| 45 | ZnO | 99.5 | $Yb_2O_3$ | 0.5 | $3.1 \times 10^3$ |
| 46 | ZnO | 99.0 | $Al_2O_3$ | 0.5.$SnO_2$ 0.5 | $7.2 \times 10^9$ |
| 47 | $(Zn_{0.5}Cd_{0.5})$99.5 | | $Al_2O_3$ | 0.5 | $5.6 \times 10^2$ |

*Sample falling outside this invention.

The raw materials for the ceramics are commercially pure grade oxides. Any compound which can be converted upon firing to the corresponding oxide can be used as a raw material. Batches of the raw materials are ball-milled with a small amount of water for intimate mixing and dried. Usually, they are pressed at about 750 kg/cm² into a disk form 15 by 1mm. The disk is fired at a temperature less than 1000° C in a carbon disulphide atmosphere. The sulphurizing is done in a transparent quartz combustion tube held horizontally in a tube furnace with a graphite boat containing the starting disk. Dry nitrogen gas is bubbled through a gas washing bottle filled with carbon disulphide to introduce it into the combustion chamber. After firing, the disc is cooled at "furnace off"

Referring to Table I, examples of the starting oxide compositions and electrical resistance of the corresponding sulphide ceramic bodies are shown. These ceramic bodies exhibit a high density characterized by a relative density more than 92 percent and a uniform ceramic with a grain size of from 1 to 10 microns so that the ceramic bodies are hard, durable and resistant to mechanical abrasion, thermal shock, oxidation and reduction. Furthermore, the simple and economic method of making them is characterized by the fact that the sintering temperature of each zinc sulphide ceramic body is much lower than the sublimation temperature thereof (1185° C) and less than 1000° C. After firing, the ceramic bodies are analysed with a Geiger-counter type X-ray diffractometer using CuKα radiation. From such tests, it is confirmed that all the ceramic bodies of these compositions consist not of mixed phases such as oxide, oxysulphide and sulphide, but only a sulphide phase. As is apparent from Table I, when using a starting oxide material consisting essentially of zinc oxide and from 0.01 atomic % to 6.0 atomic % of at least one metal oxide selected from the group consisting of aluminum, magnesium, nickel, cobalt, cadmium, lead, indium, bismuth, antimony, titanium, zirconium, silicon, tin, niobium, tantalum, tungsten, and a rare earth element consisting of yttrium, scandium and lanthanide, the corresponding sulphide ceramic bodies to tend to have a low electrical resistance. The sulphide ceramic body shown in FIG. 1 consists of a uniform sulphide phase 1. These zinc sulphide ceramics may be used for elements in various fields, for example in electrical devices such as phosphors, photoconductors, electroluminescent elements, capacitors piezoelectric transducers, etc. For example, a ZnS ceramic body can be used as a light emitting element.

A ZnS ceramic body activated with the Mn and/or Cu has a polycrystalline structure in which the $Cu_2S$ phase is precipitated at the stacking fault portion of the ZnS crystal as well as at the grain boundaries. The ceramic body can be made to emit orange-light from the junction portion formed at the interface of the ZnS and the $CU_2$ by applying a D.C. or an A.C. voltage. The working voltage (D.C.) is less than 100 volts and the luminous efficiency is more than 0.7 %. An electroluminescent body in which is used a ZnS ceramic body having a low electrical resistance can be understood to exhibit better electrical properties than the conventional ZnS.

Furthermore, a ZnS ceramic body having a low electrical resistance can be used as a luminescent screen for use with very low velocity electrons. In this case, for example, a gas plasma is used as a source of free electrons.

A ZnS ceramic body activated with Ag is a blue-emitting element. A ZnS ceramic body activated with Cu is a green-emitting element. A ZnS ceramic body activated with Mn is an orange-emitting element. By applying a small positive voltage (about 40 to 80 volts) to the phosphor electrode, an electron current (about a few mA/cm²) is drawn from the adjacent plasma to the phosphor which then emits light. These light-emitting elements have a brightness similar to that of a conventional cathodoluminescent phosphor.

It has been further discovered according to this invention that a junction ceramic body comprising a ceramic material having a layer consisting essentially of a zinc oxide ceramic body and another layer consisting essentially of the corresponding sulphide ceramic body can be obtained by sulphurizing at least one portion of a starting oxide ceramic body in a carbon disulphide atmosphere at a temperature ranging from 700° C to 1000° C which is lower than the sublimation temperature of the corresponding sulphide. The feature of the method in this case consists in sintering the starting oxide material to make it very dense, and thereafter sulphurizing the oxide ceramic body in a carbon disulphide atmosphere at a temperature which is, for example, considerably, lower than the sublimation temperature of the corresponding sulphide. Carbon disulphide diffuses through the outer position of the oxide ceramic body gradually into the interior and converts the layer of the outer ceramic body up to a certain depth to a uniform sulphide layer. The thus formed sulphide layer is well sintered by the reaction-sintering process proceeding in the presence of the reaction between oxide and carbon disulphide as aforesaid. Furthermore, the thickness of the formed sulphide layer can be easily controlled by varying the sulphurizing conditions such as the firing temperature and time. Therefore, almost all of the oxide ceramic layers can be converted into the sulphide ceramic layers.

Figure 2:
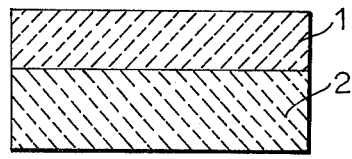
FIG. 2 is a schematic cross-sectional view of a junction ceramic body comprising a ceramic material having a layer consisting essentially of a zinc oxide ceramic body and a layer consisting essentially of the corresponding sulphide ceramic body in accordance with this invention.
Figure 3:
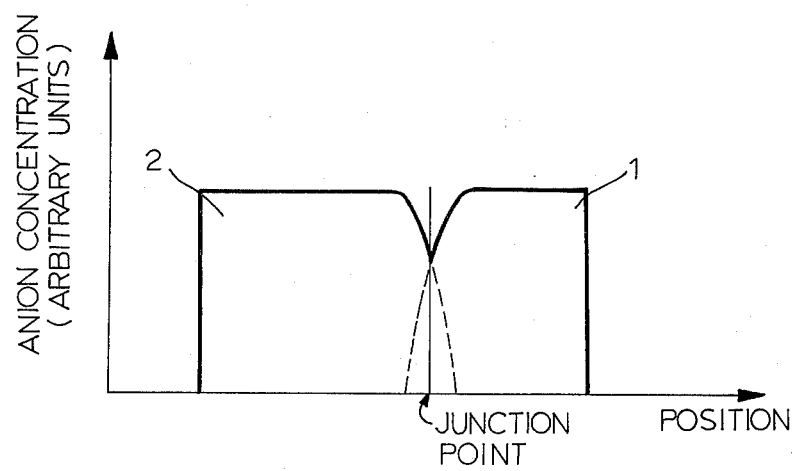
FIG. 3 is a graph of anion concentrations in the ceramic body in FIG. 2.

FIG. 2 shows a ceramic body in which a zinc oxide ceramic body 2 has one surface thereof treated by the above method to form a zinc sulphide ceramic layer 1. In FIG. 3, there is schematically shown the distribution of the sulphur and oxygen concentrations in the ceramic body in FIG. 2. It can be understood that ceramic body shown in FIG. 2 has a kind of heterojunction between the oxide and the sulphide. The formation of the heterojunction is apparent from the fact that when an electric field is applied to the junction ceramic body, a peak of the field strength appears at the junction portion of the oxide and the sulphide. The heterojunction ceramic body can exhibit various electrical properties due to the presence of the junction portion found at the interface of the oxide and the sulphide. Therefore, the junction ceramic body can be used e.g., for non-linear elements in electric devices.

A preferred method of making a junction ceramic body according to this invention is carried out in accordance with the schedule set forth hereinafter.

The raw materials for the ceramics are commercially pure grade oxide powders. Any compound which can be converted upon firing to the corresponding oxide can be used as a raw material. Batches of the raw materials are ball-milled with a small amount of water for intimate mixing and dried. They are pressed at 750 kg/cm² into a pellet form. The pellets are sintered in air at 1300° C. The sintered oxide ceramic body is then fired in a carbon disulphide atmosphere at a temperature below 1000° C by using the afore-said sulphurizing apparatus. The sulfide layer thus produced gives to the body a low electrical resistance. The ceramic bodies exhibit a very dense and uniform two layer structure. The thickness of the sulphide layer can be easily varied by controlling the sulphurizing conditions such as the firing temperature and time.

By way of example, ZnS can be used as a light emitting element. In this case, the ceramic body has a two-layer structure in which a ZnO ceramic body activated with Mn and Cu has one surface thereof treated by the aforesaid sulphurizing method to form a ZnS ceramic layer. The junction ceramic body to emit light from the junction portion formed at the interface of the ZnO and the ZnS by applying thereto a voltage lower than 50 volts. The emitted light is uniform and does not change with time. This light emitting element is free from the problems of the conventional ZnS element such as a ZnS powder incorporated in a dispersion binder of a high dielectric material with electrode materials, etc. Therefore it is apparent that the luminous efficiency is drastically improved by the junction ceramic made in accordance with this invention as it has a value more than 1.0%

In other respects, the junction ceramic body can be used in to a device such as a photovoltic element, a capacitor, piezoelectric transducers, diodes, etc.

Figure 4:
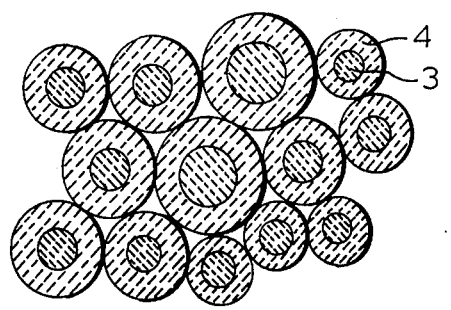
FIG. 4 is an enlarged schematic cross-sectional view of a ceramic body comprising a ceramic material consisting of ceramic particles each having a zinc sulphide layer surrounding the corresponding oxide particle in accordance with this invention.

According to this invention, it has been discovered furthermore that a ceramic material consisting of particles each having a zinc sulphide layer surrounding the corresponding oxide particle can be obtained by sulphurizing a surface layer of a zinc oxide particle. A preferred method of making such ceramic body comprises crushing a zinc oxide ceramic body into a powder, pressure-compacting the powder, and thereafter sulphurizing at least the surface layer of said oxide particles in a carbon disulphide atmosphere at a temperature ranging from 700° C to 1000° C which is lower than the sublimation temperature of said sulphide. Under these conditions, substantially all zinc oxide particles have a surface layer converted to zinc sulphide. FIG. 4 shows a schematic cross section (microstructure) of a ceramic body consisting of particles each having a zinc sulphide layer 4 surrounding the corresponding oxide particle 3, the size of the regions having been enlarged. Each such ceramic particle is also believed to form a heterojunction at the interface of the oxide and the sulphide. The ceramic bodies formed of such particles can exhibit heterojunction properties due to the existence of the interface of the oxide and the sulphide. For example, a luminescent element of ZnS can emit a light directly from the surface at which the junction portion is formed. At 10 volts, for example, a brightness of about 180 foot-Lambert is obtained at a current density of about 1mA/cm², resulting in a further improved efficiency.

These sulphide ceramic bodies may be in a disc shape, or in a rectangular shape, in a single layer structure or a multiple layer structure, or in a single disc form or a multiple disc form. They may also be in a tubular form. The zinc sulphide ceramic body according to this invention can be used particularly in a picture display device. According to the invention, a novel a ceramic picture display device comprises a ceramic material having a portion consisting essentialy of a zinc sulphide with light emitting activators so as to form a display pattern and another portion consisting essentially of at least one component selected from the group consisting of zinc sulphide and zinc oxide without light emitting activators.

Figure 5:
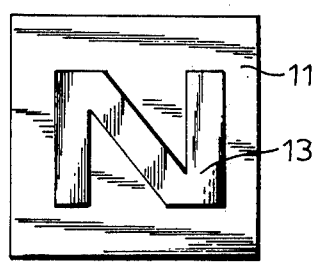
FIG. 5 is a schematic surface view of a picture display zinc sulphide ceramic body in accordance with this invention.
Figure 6:
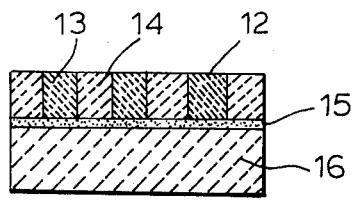
FIG. 6 is a schematic cross-sectional view of a picture display zinc sulphide ceramic body in accordance with this invention.

A preferred embodiment of this invention is illustrated in FIGS. 5 and 6 which shows a ceramic display structure which comprises a zinc oxide ceramic body 11 having one surface thereof treated by the above method to form a zinc sulphide ceramic layer 12, the zinc sulphide ceramic layer consisting of a zinc sulphide portion 13 with light emitting activators and a zinc sulphide portion 14 without light emitting activators. The ceramic body can be made to emit light from the junction portion 15 formed at the interface of the unsulphurized zinc oxide base 16 and the sulphide portion 12 with light emitting activators by applying a D.C. or A.C. voltage.

Furthermore, the above-recited light emitting ceramic body can be combined with a chalcogenide glass component such as Sb-S, P-Ge-T$l$-Si-S, etc., having charaacteristics of a semiconductor and negative resistance. Such an element can be turned from the off-state to the on-state by applying a voltage above the threshold of the chalcogenide glass and cause it to emit light. These light emitting bodies may be used in electrical elements such as a light memory device, a warning device, etc.

Of course the ceramic body can be used not only in the above-recited phosphors but also in photoconductors, capacitors, piezoelectric transducers, varistors and combinations thereof.

What is claimed is:

1. A method of making a junction ceramic body comprising a ceramic material having a layer consisting essentially of a zinc oxide ceramic body and a further layer consisting essentially of a corresponding sulphide ceramic body comprising: mixing a starting oxide material; pressure-compacting the thus mixed material; sintering the thus pressure-compacted material; and sulphurizing the surface layer of the thus sintered oxide material in a carbon disulphide atmosphere at a temperature in the range of 400° to 1000° C so as to make said surface layer a sulphide, said oxide material consisting essentially of zinc oxide and from 0.01 atomic % to 6.0 atomic % of at least one oxide of a metal selected from the group consisting of aluminum, magnesium, nickel, cobalt, cadmium, lead, indium, bismuth, antimony, titanium, zirconium, silicon, tin, niobium, tantalum, tungsten and rare earth metals.

2. A junction ceramic body made by the method of claim 5.

* * * * *